United States Patent
Suenaga et al.

(10) Patent No.: US 9,043,611 B2
(45) Date of Patent: May 26, 2015

(54) DISK ARRAY DEVICE AND DATA MANAGEMENT METHOD FOR DISK ARRAY DEVICE

(71) Applicants: Masaya Suenaga, Tokyo (JP); Wataru Saitou, Tokyo (JP)

(72) Inventors: Masaya Suenaga, Tokyo (JP); Wataru Saitou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 60 days.

(21) Appl. No.: 13/780,923

(22) Filed: Feb. 28, 2013

(65) Prior Publication Data
US 2013/0227304 A1 Aug. 29, 2013

(30) Foreign Application Priority Data
Feb. 29, 2012 (JP) .................. 2012-043837

(51) Int. Cl.
*G06F 21/00* (2013.01)
*G06F 21/60* (2013.01)
*G06F 21/80* (2013.01)

(52) U.S. Cl.
CPC .............. *G06F 21/602* (2013.01); *G06F 21/80* (2013.01)

(58) Field of Classification Search
CPC ............................... G06F 21/602; G06F 21/80
USPC ........................................... 713/193; 380/277
See application file for complete search history.

(56) References Cited

U.S. PATENT DOCUMENTS

| | | | | |
|---|---|---|---|---|
| 2006/0195704 A1* | 8/2006 | Cochran et al. | ................ | 713/193 |
| 2008/0052537 A1 | 2/2008 | Nishizono | | |
| 2009/0092252 A1 | 4/2009 | Noll et al. | | |
| 2009/0327757 A1* | 12/2009 | Kito et al. | ................. | 713/193 |
| 2010/0031062 A1 | 2/2010 | Nishihara et al. | | |
| 2010/0088525 A1* | 4/2010 | Ureche et al. | ................. | 713/193 |
| 2010/0106927 A1* | 4/2010 | Hogan et al. | ................. | 711/163 |
| 2011/0246784 A1* | 10/2011 | Hobbett et al. | ................ | 713/189 |

FOREIGN PATENT DOCUMENTS

| | | | |
|---|---|---|---|
| JP | 2005-284643 A | 10/2005 | |
| JP | 2008-52360 A | 3/2008 | |
| JP | 2009-193285 A | 8/2009 | |

(Continued)

OTHER PUBLICATIONS

Japanese Office Action for JP Application No. 2012-043837 mailed on Jan. 22, 2014. (Japanese Original).

*Primary Examiner* — Michael Pyzocha
(74) *Attorney, Agent, or Firm* — Sughrue Mion, PLLC (57) ABSTRACT

A disk array device comprises a first storage unit that stores encrypted user data, a second storage unit that is different from the first storage unit and locks and stores configuration information including a first encrypted authentication key that unlocks the encrypted user data, a management unit that includes a decoder that decodes the first encrypted authentication key and a control unit that unlocks the locked configuration information using a second authentication key, the management unit managing data using the first and second authentication keys. the management unit includes a configuration information recovery portion that unlocks the locked configuration information by using the second authentication key and recovers the configuration information during booting and a user data unlocking portion that decodes the first encrypted authentication key included in the configuration information and unlocks the encrypted user data stored in the first storage unit by using the first decoded authentication key.

1 Claim, 7 Drawing Sheets

(56) References Cited

FOREIGN PATENT DOCUMENTS

| | | |
|---|---|---|
| JP | 2009-251999 A | 10/2009 |
| JP | 2010-33319 A | 2/2010 |
| JP | 2010-524410 A | 7/2010 |
| JP | 2010-288123 A | 12/2010 |
| JP | 2011-197928 A | 10/2011 |
| JP | 2012191511 A | 10/2012 |

* cited by examiner

DISK ARRAY DEVICE AND DATA MANAGEMENT METHOD FOR DISK ARRAY DEVICE

CROSS-REFERENCES

This application is based upon and claims the benefit of priority from Japanese patent application No 2012-043837, filed on Feb. 29, 2012, the disclosure of which is incorporated here in its entirety by reference.

BACKGROUND

The present invention relates to a disk array device and a data management method for the disk array device.

As a method of realizing a disk array device that uses encrypted hard disk drives (HDDs), a method of implementing dedicated application software for managing encrypted HDDs on a host device to manage an authentication key of each encrypted HDD is known. In this method, there is a problem in that a user needs to manage the authentication key for each of the encrypted HDDs using the dedicated application software.

As a method of solving such a problem, a method of managing an authentication key for each pool to allow a disk array device to manage the authentication key (for example, see Patent Publication JP-A-2012-191511).

According to the technique disclosed in Patent Publication JP-A-2011-054543, although it is possible to solve the problem that a user needs to manage the authentication key for each of the encrypted HDDs, since the authentication key is encrypted and stored in each encrypted HDD, there is another problem in that if the encrypted key is decoded, user data can be read.

Further, since the encrypted authentication key is stored for each encrypted HDD, there is a problem in that when it is not possible to read an area in which the authentication key is stored due to a media error or the like, it is not possible to read the authentication key of the encrypted HDD and to unlock the authentication key.

SUMMARY

An exemplary object of the invention is to provide a disk array device and a data management method for the disk array device capable of preventing user data from being read when an authentication key is decoded and preventing the occurrence of a situation in which it is not possible to unlock the authentication key.

According to an aspect of the present invention, there is provided a disk array device including: a first storage unit that stores encrypted user data obtained by encrypting user data; a second storage unit that is different from the first storage unit and locks and stores configuration information including a first encrypted authentication key that unlocks the encrypted user data; a management unit that includes a decoder that decodes the first encrypted authentication key and a control unit that unlocks the locked configuration information using a second authentication key, the management unit managing data using the first and second authentication keys, wherein the management unit includes a configuration information recovery portion that unlocks the locked configuration information by using the second authentication key and recovers the configuration information during booting, and a user data unlocking portion that decodes the first encrypted authentication key included in the recovered configuration information and unlocks the encrypted user data stored in the first storage unit by using the first decoded authentication key.

According to another aspect of the present invention, there is provided a data management method for a disk array device including: a first storage unit that stores encrypted user data obtained by encrypting user data; a second storage unit that is different from the first storage unit and locks and stores configuration information including a first encrypted authentication key that unlocks the encrypted user data; a management unit that includes a decoder that decodes the first encrypted authentication key and a control unit that unlocks the locked configuration information by using a second authentication key, the management unit managing data by using the first and second authentication keys, the data management method comprising: unlocking the locked configuration information by using the second authentication key and recovering the configuration information during booting; and decoding the first encrypted authentication key included in the recovered configuration information and unlocking the encrypted user data stored in the first storage unit by using the first decoded authentication key.

According to the aspect of the present invention, it is possible to provide a disk array device and a data management method for the disk array device capable of preventing user data from being read when an authentication key is decoded and preventing the occurrence of a situation in which it is not possible to unlock the authentication key.

DETAILED DESCRIPTION

Hereinafter, an embodiment of the present invention will be described with reference to the drawings.

Figure 1:
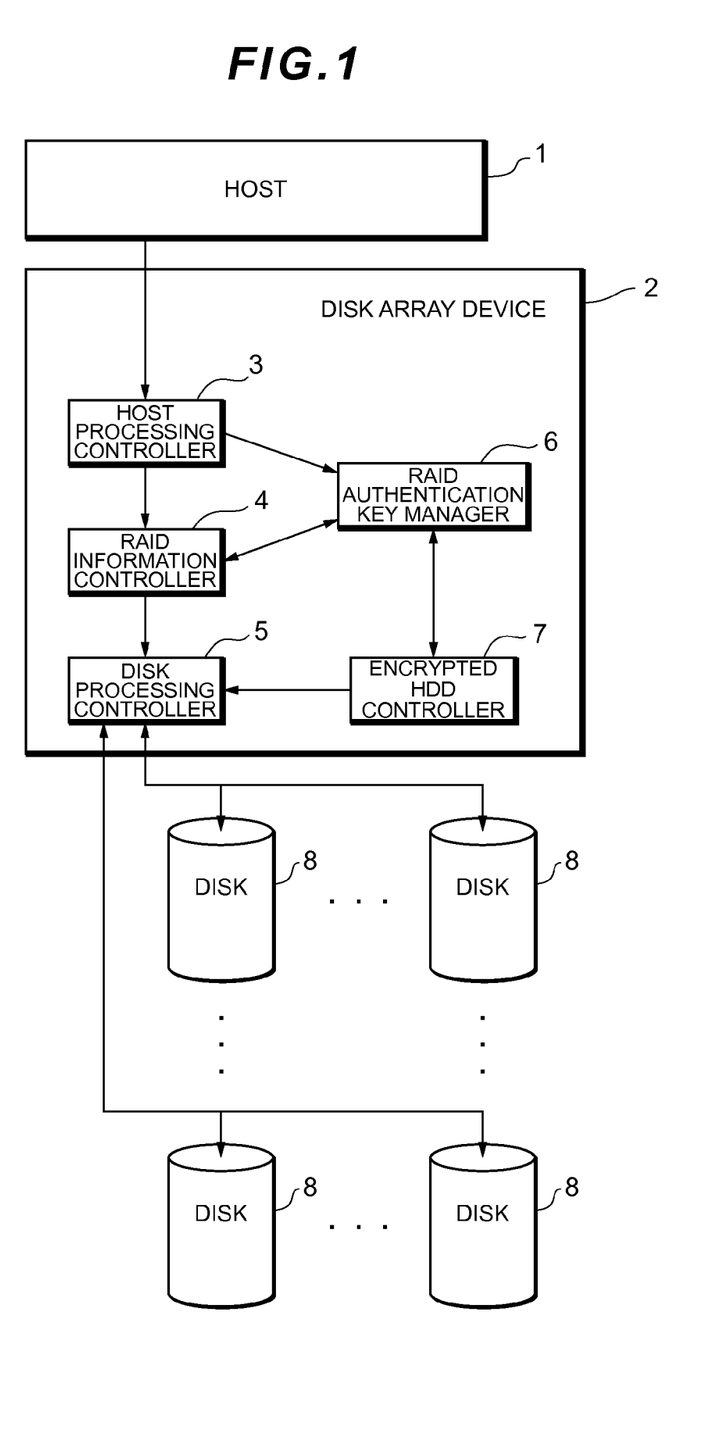
FIG. 1 is a diagram showing a configuration of a disk array device according to an embodiment of the present invention.

As shown in FIG. 1, a host 1 and a disk array device 2 are communicably connected, and the disk array device 2 includes a host processing controller 3, a redundant arrays of inexpensive disks (RAID) information controller 4, a disk processing controller 5, a RAID authentication key manager 6 which is a decoder, and an encrypted HDD controller 7 which is a control unit. Further, the RAID information controller 4, the RAID authentication key manager 6, and the encrypted HDD controller 7 form a management unit.

When the disk array device 2 receives a read or write command from the host 1, the host processing controller 3 issues a command to the RAID information controller 4 based on the received read or write command.

The RAID information controller 4 issues a command to a disk 8, in which data requested from the host 1 is stored, via the disk processing controller 5, and sends a termination notice to the host 1 via the host processing controller 3.

A pool authentication key of each pool which will be described in detail later is managed by the RAID authentication key manager 6. Further, when the disk array device 2 receives a command to change a pool authentication key from the host 1, the host processing controller 3 sends a notification to the RAID information controller 4 to inform that the pool authentication key has been changed.

Further, the RAID information controller 4 determines whether it is necessary to change a HDD authentication key of each disk 8 according to a state of the pool. The HDD authentication key is an authentication key that unlocks encrypted user data stored in a user area. When it is determined that it is necessary to change the HDD authentication key of each disk 8, the RAID information controller 4 sends a notification to the RAID authentication key manager 6 to inform that it is necessary to change the pool authentication key. Further, the RAID information controller 4 updates the HDD authentication key stored in the disk 8 via the disk processing controller 5. The pool is a storage area that is configured of the storage areas of a plurality of disks 8.

For example, there are five cases where it is necessary to change the HDD authentication key.

A first case is when the disk 8 that constitutes a pool is replaced with a new disk 8. In this case, the RAID information controller 4 changes the HDD authentication key of the replaced disk 8. Specifically, the HDD authentication key of the new disk 8 is changed from a default authentication key to a pool authentication key of the corresponding pool.

A second case is when a new disk 8 is added to a pool due to volume expansion or the like. In this case, the RAID information controller 4 changes the HDD authentication key of the added disk 8. Specifically, the HDD authentication key of the added disk 8 is changed from a default authentication key to the pool authentication key of the corresponding pool.

A third case is when the disk 8 is degenerated from a pool, a spare disk (described later) is incorporated in to the pool, and restoration of the pool is operated by the spare disk. In this case, since the spare disk is added to the pool, the RAID information controller 4 changes the authentication key of the spare disk. Specifically, the HDD authentication key of the spare disk is changed from a default authentication key to the pool authentication key of the corresponding pool.

A fourth case is when a pool is unbound. In this case, the RAID information controller 4 changes the pool authentication key of the disk 8 that constitutes the unbound pool. Specifically, the HDD authentication key of the disk 8 that constitutes the pool is changed from the pool authentication key of the corresponding pool to a default authentication key.

A fifth case is when a pool authentication key is updated based on an instruction from the host 1, for example. In this case, the RAID information controller 4 changes the authentication key of the disk 8 in the pool. Specifically, the HDD authentication key of the disk 8 in the corresponding pool is changed from a pool authentication key before the updating to an updated pool authentication key.

The RAID authentication key manager 6 manages the pool authentication key of each pool as described above. Upon receiving the notification of change in the pool authentication key from the RAID information controller 4, the RAID authentication key manager 6 makes an inquiry to the RAID information controller 4 about configuration information and sends a notification to the encrypted HDD controller 7 based on the result of the inquiry to inform that there is the disk 8 of which the HDD authentication key needs to be changed. Further, the RAID authentication key manager 6 decodes an encrypted pool authentication key that is included in configuration information that is recovered from a configuration information writing disk group 8a described later.

Upon receiving, from the RAID authentication key manager 6, the notification informing that there is the disk 8 of which the HDD authentication key needs to be changed, the encrypted HDD controller 7 sets the HDD authentication key of each disk 8 of which the HDD authentication key needs to be changed via the disk processing controller 5. More specifically, the encrypted HDD controller 7 sets the HDD authentication key to a default authentication key or a pool authentication key.

Moreover, when the disk array device 2 is booted, the encrypted HDD controller 7 makes an inquiry to the RAID authentication key manager 6 about a pool authentication key and unlocks the HDD authentication key of the encrypted HDD based on the result of the inquiry via the disk processing controller 5.

The plurality of disks 8 includes the configuration information writing disk group 8a that stores only configuration information, a disk (encrypted HDD) 8b that is incorporated into a pool, and a disk 8c that is not incorporated into a pool. The disk 8c that is not incorporated into a pool is managed as a spare disk (see FIG. 2).

Next, a mechanism that allows the disk array device 2 to manage data using an authentication key will be described with reference to FIG. 2.

The disk array device 2 is configured to decode encrypted user data using two types of authentication keys. The two authentication keys include a pool authentication key (first authentication key) that unlocks the encrypted user data that is encrypted and stored in a user area of the disk (encrypted HDD) 8b that constitutes a pool and a default authentication key (second authentication key) that unlocks (authenticates) the lock of a configuration information area of the disk 8 in which the configuration information is stored.

Figure 2:
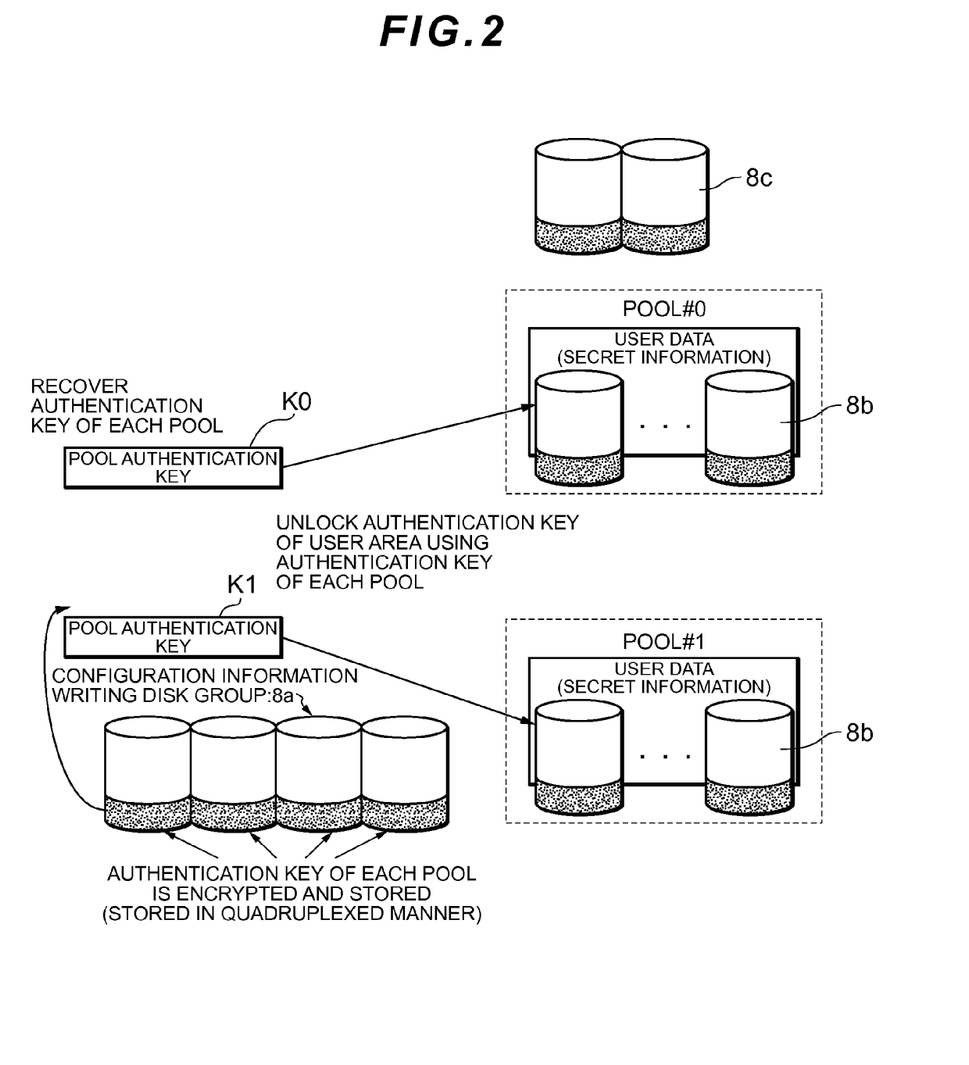
FIG. 2 is a diagram for explaining a management method of managing data using an authentication key according to the embodiment.

As shown in FIG. 2, a pool authentication key of each pool is stored in the configuration information writing disk group 8a that includes four disks 8. The configuration information writing disk group 8a is configured to encrypt and store the pool authentication key in a quadruplexed manner using four disks 8. It is only sufficient that the pool authentication key is stored in a multiplexed manner without limiting to quadruplexing. Further, a number of pool authentication keys corresponding to the number of pools are provided without limiting to one pool authentication key.

For example, as shown in FIG. 2, the disk array device 2 is configured to be capable of recovering pool authentication keys K0 and K1 of pools #0 and #1 using a default authentication key. Moreover, the disk array device 2 is configured to be capable of unlocking encrypted user data stored in user areas of the pools #0 and #1 using the recovered pool authentication keys K0 and K1.

Figure 3:
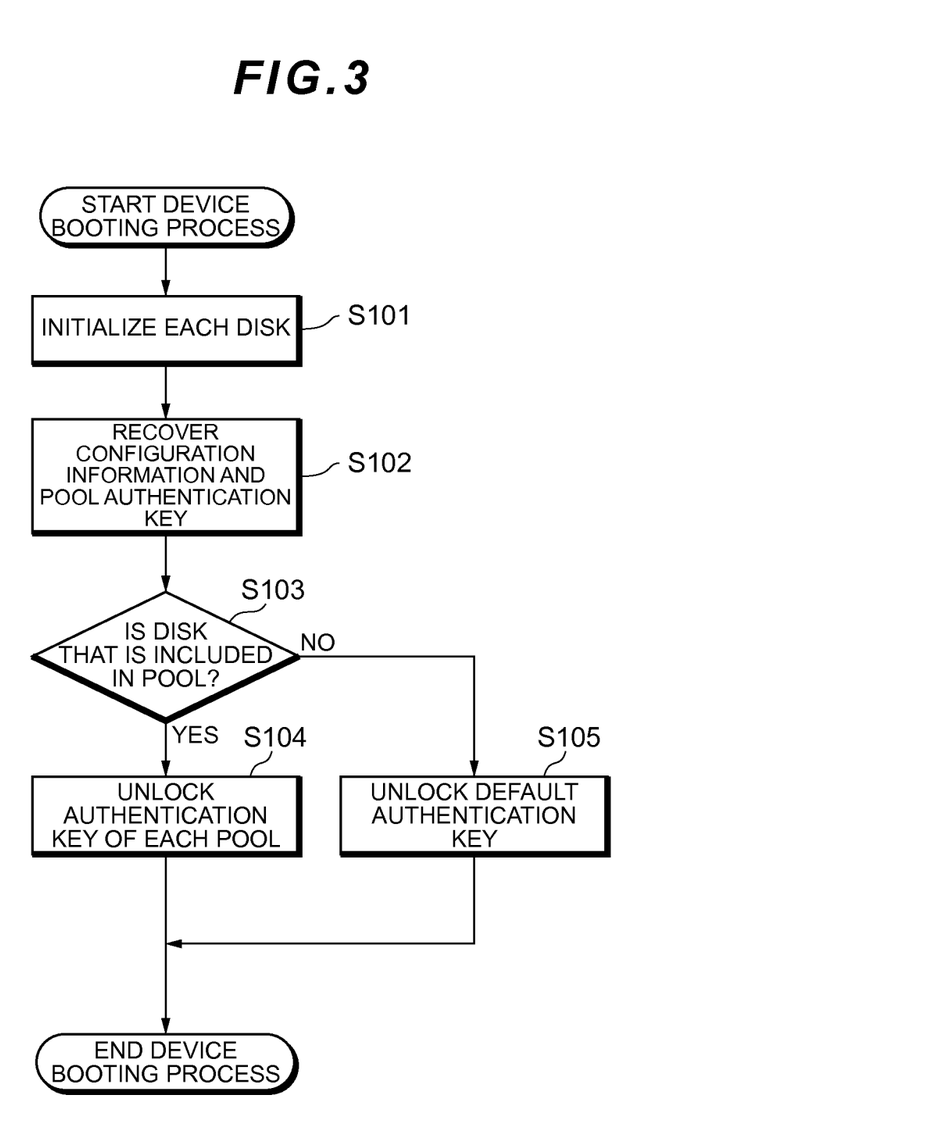
FIG. 3 is a flowchart showing a process of booting a disk array device according to the embodiment.

Next, a process of booting the disk array device 2 shown in FIG. 1 will be described with reference to FIG. 3.

First, a process of initializing each disk 8 is performed (S101). More specifically, the disk processing controller 5 performs a process of initializing each disk 8. Moreover, the encrypted HDD controller 7 unlocks the configuration information area of each disk 8 using the default authentication key via the disk processing controller 5, determines whether the disk 8 is identical to a disk 8 that is included in the configuration information, and degenerates the disk 8 that is determined not to be identical.

After the process of initializing all disks 8 is completed in this manner, a process of recovering the configuration information stored in the configuration information writing disk group 8a is performed (S102). More specifically, the RAID information controller 4 performs a process of recovering the configuration information via the disk processing controller 5. Moreover, the RAID authentication key manager 6 decodes each pool authentication key that is encrypted and stored as a part of the configuration information to recover a pool authentication key of each pool. A configuration information recovery portion is implemented by the process of step S102.

Subsequently, the RAID information controller 4 determines based on the configuration information recovered in step S102 whether each disk 8 is a disk which is included in a pool (S103).

When the disk is determined to be the disk 8 that is included in a pool (S103: YES), the encrypted HDD controller 7 makes an inquiry to the RAID authentication key manager 6 about the pool authentication key and unlocks the authentication key of the user area of the disk 8b using the pool authentication key obtained from the result of the inquiry via the disk processing controller 5 (S104). A user data unlocking portion is implemented by the process of step S104.

On the other hand, when the disk is determined to be the disk 8c (spare disk or non-use disk) that is not included in a pool (S103: NO), the encrypted HDD controller 7 unlocks the authentication key of the user area of the disk 8c using the default authentication key via the disk processing controller 5 (S105).

In this manner, the disk array device 2 unlocks the user areas of the disks 8b and 8c using the default authentication key and the pool authentication key. Due to this, the disk array device 2 can use the encrypted user data stored in the user area.

Figure 4:
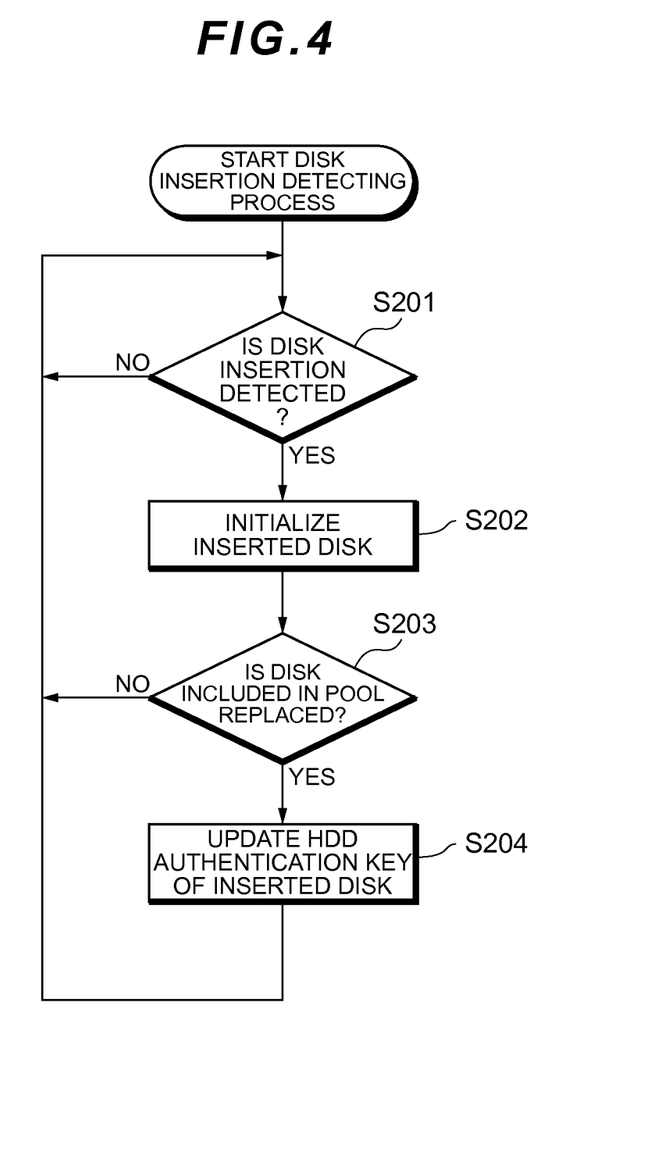
FIG. 4 is a flowchart showing a process when a disk is replaced according to the embodiment.

Next, a process of the disk array device 2 when the disk 8 is replaced with a new disk 8 will be described with reference to the flowchart of FIG. 4.

The RAID information controller 4 monitors whether the disk 8 is inserted or removed and periodically determines whether insertion of the disk 8 is detected (S201). When the RAID information controller 4 determines that the insertion of the disk 8 is not detected (S201: NO), the flow returns to the process of step S201.

When the insertion of the disk 8 is detected (S201: YES), the RAID information controller 4 executes initialization of the inserted disk 8 via the disk processing controller 5 (S202).

When the initialization of the disk 8 is performed in step S201, the RAID information controller 4 determines whether a disk 8 included in a pool is replaced with the inserted disk 8 (S203).

When it is determined that a disk 8 included in a pool is replaced with the inserted disk (S203: YES), the encrypted HDD controller 7 makes an inquiry to the RAID authentication key manager 6 about the pool authentication key of the corresponding pool and updates the HDD authentication key of the disk 8 inserted, via the disk processing controller 5, to the pool authentication key based on the result of the inquiry (S204).

When the HDD authentication key of the disk 8 is updated from the default authentication key to the pool authentication key in step S204, the RAID information controller 4 returns to the process of step S201.

Figure 5:
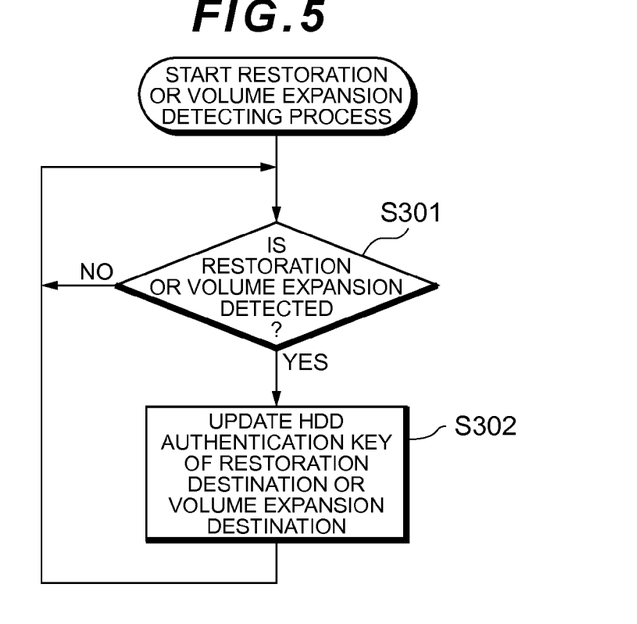
FIG. 5 is a flowchart showing a restoration or volume expansion process according to the embodiment.

Next, the operation of the disk array device 2 when a restoration or volume expansion process is performed will be described with reference to the flowchart of FIG. 5.

The RAID information controller 4 monitors whether a restoration or volume expansion instruction is issued and periodically determines whether a restoration or volume expansion instruction is detected (S301). When the RAID information controller 4 determines that a restoration or volume expansion instruction is not detected (S301: NO), the flow returns to step S301.

When a restoration or volume expansion instruction is detected (S301: YES), the encrypted HDD controller 7 performs the following processes based on an instruction of the RAID information controller 4 (S302).

When a restoration instruction is received, the encrypted HDD controller 7 makes an inquiry to the RAID authentication key manager 6 about a pool authentication key of a pool that is instructed to be restored. Moreover, the encrypted HDD controller 7 changes the HDD authentication key of the spare disk 8c used for restoration to the pool authentication key based on the result of the inquiry via the disk processing controller 5. After that, the RAID information controller 4 executes restoration.

Further, when a volume expansion instruction is received, similarly to when the restoration instruction is received as described above, the encrypted HDD controller 7 makes an inquiry to the RAID authentication key manager 6 about the pool authentication key of a pool in which volume expansion is to be performed. Moreover, the encrypted HDD controller 7 changes the HDD authentication key of a non-use disk 8 in which volume expansion is to be performed to the pool authentication key based on the result of the inquiry. After that, the RAID information controller 4 executes volume expansion.

When the RAID information controller 4 finishes the restoration process or the volume expansion process, the flow returns to step S301. In this manner, the restoration or volume expansion process of the disk array device 2 is executed.

Figure 6:
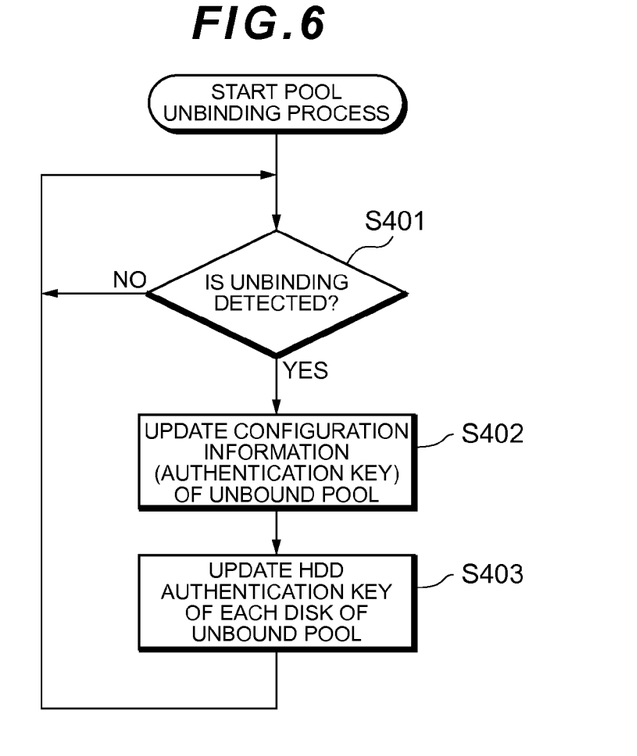
FIG. 6 is a flowchart showing an unbind process according to the embodiment.

Next, the operation of the disk array device 2 when a pool is unbound will be described with reference to the flowchart of FIG. 6.

The RAID information controller 4 monitors whether an unbind instruction is issued and periodically determines whether an unbind instruction is detected (S401). When the RAID information controller 4 determines that an unbind instruction is not detected (S401: NO), the flow returns to the process of step S401.

When it is determined that an unbind instruction is detected (S401: YES), the RAID information controller 4 updates the pool authentication key of a corresponding pool stored in the RAID authentication key manager 6 to the default authentication key via the disk processing controller 5 and updates the pool authentication key of the configuration information writing disk group 8a to the default authentication key (S402).

Subsequently, the encrypted HDD controller 7 makes an inquiry to the RAID authentication key manager 6 about the pool authentication key and changes the authentication key of each disk 8 that constitutes the unbound pool from the pool authentication key to the default authentication key via the disk processing controller 5 based on the result of the inquiry (S403). After that, the flow returns to the process of step S401. In this manner, the unbind process of the disk array device 2 is executed.

Figure 7:
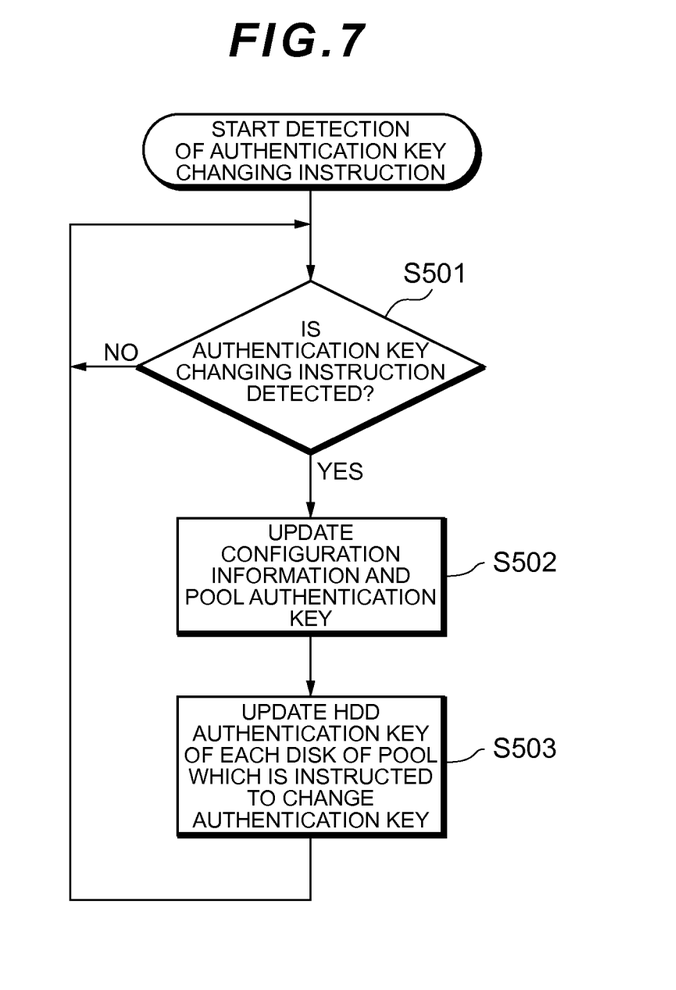
FIG. 7 is a flowchart showing an authentication key changing process according to the embodiment.

Next, the process of the disk array device 2 when the pool authentication key is changed will be described with reference to the flowchart of FIG. 7.

The RAID information controller 4 monitors whether a pool authentication key changing instruction is issued and periodically determines whether a pool authentication key changing instruction is detected (S501). When the RAID information controller 4 determines that a pool authentication key changing instruction is not detected (S501: NO), the flow returns to the process of step S501.

When it is determined that the authentication key changing instruction is detected (S501: YES), the RAID information controller 4 updates the pool authentication key managed by the RAID authentication key manager 6 to a new pool authentication key and updates the pool authentication key of the configuration information stored in the configuration information writing disk group 8a to a new pool authentication key (S502).

Subsequently, the encrypted HDD controller 7 makes an inquiry to the RAID authentication key manager 6 about the pool authentication key and updates the HDD authentication key of each disk that constitutes a corresponding pool to the new pool authentication key based on the result of the inquiry via the disk processing controller 5 (step S503). After that, the flow returns to the process of step S501. In this manner, a pool authentication key changing process is executed.

According to the disk array device 2 configured in this manner, since the HDD authentication key of the disk 8 can be encrypted and managed in respective pools in the dedicated configuration information writing disk group 8a that is different from the disk 8 that stores encrypted user data, it is possible to prevent the occurrence of a situation in which the HDD authentication key of the disk 8 is decoded, and the encrypted user data is unlocked and read.

Moreover, when the disk 8 is removed from a pool, the disk 8 can be reused by initializing the disk 8, more specifically, by recovering the HDD authentication key of the disk 8 to the default authentication key and deleting the user data.

Further, since the pool authentication key of each pool is stored in a quadruplexed manner in the dedicated configuration information writing disk group 8a that manages the configuration information, it is possible to prevent the occurrence of a situation in which it is not possible to read an area in which the HDD authentication key is stored due to a failure such as a media error. Thus, it is possible to prevent the occurrence of a situation in which it is not possible to unlock the HDD authentication key of the user area.

Figure 8:
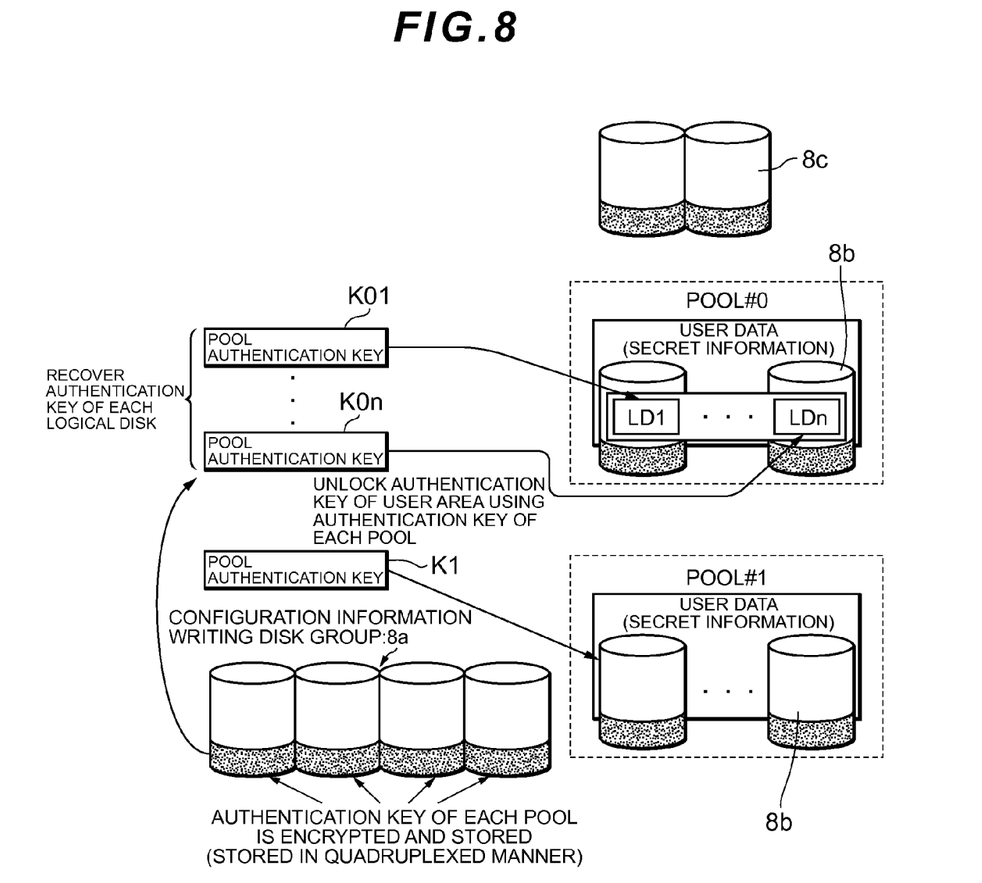
FIG. 8 is a diagram for explaining a method of managing data using an authentication key according to a modification of the embodiment.

In the above embodiment, although a case where the user areas are divided into respective user areas and the authentication key is managed for each pool has been described, the present invention is not limited to this. For example, as shown in FIG. 8, the HDD authentication key may be managed for each logical disk.

The present invention is not limited to the above embodiment, and various modifications can be made when practicing the present invention.

Part or all of the embodiments are described in the following additions but are not limited thereto.

Addition 1

A disk array device comprising:
a first storage unit that stores encrypted user data obtained by encrypting user data;
a second storage unit that is different from the first storage unit and locks and stores configuration information including a first encrypted authentication key that unlocks the encrypted user data;
a management unit that includes a decoder that decodes the first encrypted authentication key and a control unit that unlocks the locked configuration information using a second authentication key, the management unit managing data using the first and second authentication keys,
wherein the management unit includes:
a configuration information recovery portion that unlocks the locked configuration information by using the second authentication key and recovers the configuration information during booting; and
a user data unlocking portion that decodes the first encrypted authentication key included in the recovered configuration information and unlocks the encrypted user data stored in the first storage unit by using the first decoded authentication key.

Addition 2

The disk array device according to addition 1,
wherein the first storage unit is a pool that is configured of a plurality of storage devices, and
the second storage unit stores only the configuration information.

Addition 3

The disk array device according to addition 2, wherein the second storage unit stores the configuration information after multiplexing the same.

Addition 4

The disk array device according to addition 2, wherein when the second storage unit is unbound, the control unit sets an authentication key of a storage unit that is unbound from the first authentication key to a default authentication key.

Addition 5

The disk array device according to addition 1, comprising a plurality of first storage units,
wherein the management unit unlocks the plurality of first storage units by using a plurality of second different authentication keys.

Addition 6

The disk array device according to addition 1,
wherein the first storage unit is configured of a plurality of logical disks,
the configuration information includes a plurality of first encrypted authentication keys corresponding to the plurality of logical disks provided in the first storage unit, and
the management unit unlocks encrypted user data stored in a logical disk that corresponds to a first authentication key that is decoded by the decoder by using the first decoded authentication key.

Addition 7

A data management method for a disk array device including:
a first storage unit that stores encrypted user data obtained by encrypting user data;
a second storage unit that is different from the first storage unit and locks and stores configuration information including a first encrypted authentication key that unlocks the encrypted user data;
a management unit that includes a decoder that decodes the first encrypted authentication key and a control unit that unlocks the locked configuration information by using a second authentication key, the management unit managing data by using the first and second authentication keys,
the data management method comprising:
unlocking the locked configuration information by using the second authentication key and recovering the configuration information during booting; and decoding the first encrypted authentication key included in the recovered configuration information and unlocking the encrypted user data stored in the first storage unit by using the first decoded authentication key.

The present invention can be widely applied to a disk array device that uses an authentication key and a data management method for the disk array device.

We claim:

1. A disk array device comprising:
a first storage unit configured to store encrypted user data obtained by encrypting user data;
a second storage unit different from the first storage unit and configured to lock and store configuration information including a first encrypted authentication key that unlocks the encrypted user data; and
a management unit including a decoder configured to decode the first encrypted authentication key and a control unit configured to unlock the locked configuration information using a second authentication key, the management unit configured to manage data using the first and second authentication keys, wherein:
the management unit comprises:
a configuration information recovery portion configured to unlock the locked configuration information by using the second authentication key and to recover the configuration information during booting; and
a user data unlocking portion configured to decode the first encrypted authentication key included in the recovered configuration information and to unlock the encrypted user data stored in the first storage unit by using the first decoded authentication;
the first storage unit is a pool configured of a plurality of storage devices;
the second storage unit is configured to store only the configuration information; and
when the second storage unit is unbound, the control unit sets an authentication key of a storage unit that is unbound from the first authentication key to a default authentication key.

* * * * *